(12) United States Patent
Hesse et al.

(10) Patent No.: US 7,433,740 B2
(45) Date of Patent: Oct. 7, 2008

(54) CAN COMMUNICATION FOR BUILDING AUTOMATION SYSTEMS

(75) Inventors: Scott Hesse, Longmont, CO (US); Craig Ogawa, Loveland, CO (US); Gary Kiwimagi, Greeley, CO (US); Craig Files, Fort Collins, CO (US)

(73) Assignee: Colorado vNet, LLC, Loveland, CO (US)

( * ) Notice: Subject to any disclaimer, the term of this patent is extended or adjusted under 35 U.S.C. 154(b) by 0 days.

(21) Appl. No.: 11/305,793

(22) Filed: Dec. 16, 2005

(65) Prior Publication Data

US 2006/0095146 A1 May 4, 2006

Related U.S. Application Data

(63) Continuation-in-part of application No. 11/216,685, filed on Aug. 31, 2005, which is a continuation-in-part of application No. 10/382,979, filed on Mar. 5, 2003, now abandoned.

(51) Int. Cl.
G05B 15/00 (2006.01)
(52) U.S. Cl. ......................................................... 700/1
(58) Field of Classification Search ........................ 700/1
See application file for complete search history.

(56) References Cited

U.S. PATENT DOCUMENTS

| | | | |
|---|---|---|---|
| 5,510,975 A | 4/1996 | Ziegler, Jr. | |
| 5,528,215 A | 6/1996 | Siu et al. | |
| 5,551,053 A | 8/1996 | Nadolski et al. | |
| 5,579,221 A | 11/1996 | Mun | |
| 5,621,662 A | 4/1997 | Humphries et al. | |
| 5,696,695 A * | 12/1997 | Ehlers et al. | ............. 700/286 |
| 5,703,442 A | 12/1997 | Notohamiprodjo | |
| 5,784,547 A | 7/1998 | Dittmar et al. | |
| 5,938,757 A | 8/1999 | Bertsch | |
| 5,940,387 A | 8/1999 | Humpleman | |
| 6,038,500 A | 3/2000 | Weiss | |
| 6,192,282 B1 * | 2/2001 | Smith et al. | ................. 700/19 |
| 6,199,136 B1 | 3/2001 | Shteyn | |

(Continued)

OTHER PUBLICATIONS

Fernando Moraes et al., "using the CAN Protocol and Reconfigurable Computing Technology for Web-Based Smart House Automation", IEEE, 2001.*

(Continued)

*Primary Examiner*—Michael B Holmes
(74) *Attorney, Agent, or Firm*—Peter B. Scull; Berenbaum Weinshienk & Eason Trenner Law Firm

(57) ABSTRACT

Systems and methods for implementing CAN communication for building automation systems are disclosed. An exemplary system may comprise at least one sending device linked to a plurality of receiving devices over a CAN automation network. A control frame may be broadcast over the CAN automation network by the at least one sending device, the control frame encapsulated into a CAN extended data frame. An acceptance filter may be provided at each of the plurality of receiving devices, each of the plurality of receiving devices reading the control frame from the CAN extended data frame and determining if the receiving device is a target device based on the control frame. Device communication may also be implemented as methods for dynamic address assignment and firmware download.

10 Claims, 9 Drawing Sheets

U.S. PATENT DOCUMENTS

| | | | |
|---|---|---|---|
| 6,263,260 | B1 | 7/2001 | Bodmer et al. |
| 6,292,862 | B1 | 9/2001 | Barrenscheen et al. |
| 6,297,724 | B1 * | 10/2001 | Bryans et al. ............... 340/3.51 |
| 6,336,128 | B1 | 1/2002 | Eisenmann et al. |
| 6,437,692 | B1 * | 8/2002 | Petite et al. ................. 340/540 |
| 6,609,172 | B1 | 8/2003 | Stringham |
| 6,728,268 | B1 * | 4/2004 | Bird ........................... 370/474 |
| 6,914,893 | B2 * | 7/2005 | Petite ......................... 370/338 |
| 6,967,565 | B2 * | 11/2005 | Lingemann ............ 340/310.11 |
| 6,990,393 | B2 * | 1/2006 | Parker ........................ 700/282 |
| 7,027,808 | B2 * | 4/2006 | Wesby ........................ 455/419 |
| 7,053,767 | B2 * | 5/2006 | Petite et al. ................. 340/531 |
| 7,058,508 | B2 * | 6/2006 | Combs et al. ............... 701/213 |
| 7,089,066 | B2 * | 8/2006 | Hesse et al. .................... 700/2 |
| 7,103,511 | B2 * | 9/2006 | Petite ......................... 702/188 |
| 7,139,239 | B2 * | 11/2006 | McFarland .................. 370/228 |
| 2003/0074511 | A1 | 4/2003 | Kramer et al. |

OTHER PUBLICATIONS

The application of intelligent building techniques to care service provision Sharples, S.; Callaghan, V.; Clarke, G.; Intelligent Methods in Healthcare and Medical Applications (Digest No. 1998/514), IEE Colloquium on Oct. 20, 1998 pp. 11/1-11/3.*

A distributed simulator for large networks used in building automation systems Hunstock, R.; Ruping, S.; Ruckert, U.; Factory Communication Systems, 2000. Proceedings. 2000 IEEE International Workshop on Sep. 6-8, 2000 pp. 203-210 Digital Object Identifier 10.1109/WFCS.2000.882551.*

Fault Tolerant BBMD in the BACnet/IP Protocol Cho, S.U.; Hong, S.H.; Industrial Technology, 2006. ICIT 2006. IEEE International Conference on Dec. 15-17, 2006 pp. 2747-2751 Digital Object Identifier 10.1109/ICIT.2006.372651.*

Leveraging the Web: A Universal Framework for Building Automation Samad, T.; Frank, B.; American Control Conference, 2007. ACC '07 Jul. 9-13, 2007 pp. 4382-4387 Digital Object Identifier 10.1109/ACC.2007.4282471.*

Luca Stagnaro, HurriCANe: VHDL CAN Controller core, Mar. 2000, Spacecraft Control and Data Systems Division, Automation and Information Dept., European Space Agency.

Luca Stagnaro, CAN Controller for HurriCANe: VHDL Mar. 2000, Spacecraft Control and Data Systems Division, Automation and Information Dept., European Space Agency.

Luca Stagnaro, AMBA Interface for HurriCANe: VHDL IP, Mar. 2000, Spacecraft Control and Data Systems Division, Automation and Information Dept., European Space Agency.

Luca Stagnaro, "Hurricane IP Core Home Page", available on the internet at ftp://ftp.estec.esa.nl/pub/ws/wsd/CAN/can.htm.

Hans-Christian Reuss, "Extended Frame Format—A New Option of the CAN Protocol", 1992-1993.

F. Moraes, et al. "Using the CAN Protocol and Reconfigurable Computing Technology for Web-Based Smart House Automation." Integrated Circuits and Systems Design, 2001, 14th Symposium, Sep. 10-15, 2001, pp. 38-43.

"CAN Bus Megafunction" Solution Brief 22, dated Sep. 1997, ver. 1, Altera Corporation, San Jose, CA 95134, 3 pages.

"Building Automation" published to the Internet at http://www.can-cia.de/can/application/building, last modified Oct. 31, 2002, 1 page.

"CAN Remote Automation and Control with the AVR" published to the Internet at http://www.cs.unibo.it/~lanconel/projects.html, at least as early as Dec. 13, 2002, 1 page.

"CAN Remote Automation and Control with the AVR" published to the Internet at http://caraca.sourceforge.net/, at least as early as Dec. 13, 2002, pp. 2-6.

Ron Smith, "FAQ Page" and "Quick Reference For RS485, RS422, RS232, And RS423", 9 pages, available at www.rs485.com, FAQ Page updated Jul. 20, 2002.

* cited by examiner

*Fig. 2*

| SIGNAL DATA | INSTRUCTION |
|---|---|
| DEVICE 1; KEY 1 | MAIN LIGHTING 50% PERIMETER LIGHTING ON |
| DEVICE 1; KEY 2 | SECURITY ACTIVATED |
| ⋮ | ⋮ |

CAN COMMUNICATION FOR BUILDING AUTOMATION SYSTEMS

PRIORITY CLAIM

This application claims priority as a continuation-in-part of co-owned U.S. patent application Ser. No. 11/216,685 for "CAN BUS ROUTER FOR BUILDING AUTOMATION SYSTEMS" of Hesse, et al., filed Aug. 31, 2005, which is a continuation-in-part of co-owned U.S. patent application Ser. No. 10/382,979 for "BUILDING AUTOMATION SYSTEM AND METHOD" of Hesse, et al., filed Mar. 5, 2003, now abandoned each of these patent applications are hereby incorporated by reference in its entirety as though fully set forth herein.

TECHNICAL FIELD

The described subject matter relates to building automation, and more particularly to Control Area Network (CAN) communication for building automation systems.

BACKGROUND

The ability to control one or more devices in a building (e.g., lighting, heating, air conditioning, security systems) based on one or more parameters (e.g., time, temperature, user preference) is known as building automation. Building automation may be implemented in any of a number of different types of buildings, including homes, offices, restaurants, stores, theaters, and hotels, to name only a few examples.

Building automation systems operate by issuing commands from a control panel (e.g., a keypad) to an output device (e.g., a lamp control). Inexpensive building automation systems are available which use the existing electrical wiring in the building for issuing commands to the output device. The control panel and output device are each plugged into electrical outlets in the home and the control panel issues commands via the electrical wiring in the home. However, the commands may be distorted or lost due to "noise" in the electrical wiring. In addition, such systems are limited to relatively few output devices.

Inexpensive building automation systems are also available in which the control panel issues radio frequency (RF) commands to the output devices. However, RF transmission is typically limited in range (e.g., by government regulation) and is subject to interference (e.g., from other RF devices).

Other building automation systems are available which implement RS232 architecture to issue commands from the control panel to the output devices. The RS232 architecture allows more reliable data exchange between the control panel and the output devices. However, the control panel (e.g., keypad) must be directly connected to each of the output devices (i.e., a point-to-point or so-called "hub-and-spoke" arrangement). Such an arrangement can only be used for short runs and is wiring intensive, making these systems expensive to install and maintain. In addition, the RS232 architecture does not provide for error-handling.

SUMMARY

Control Area Network (CAN) communication systems and methods for building automation systems are disclosed. An exemplary embodiment may be implemented as a building automation system comprising at least one sending device linked to a plurality of receiving devices over a CAN automation network. A control frame broadcast over the CAN automation network by the at least one sending device, the control frame encapsulated into a CAN extended data frame. An acceptance filter may be provided at each of the plurality of receiving devices, each of the plurality of receiving devices reading the control frame from the CAN extended data frame and determining if the receiving device is a target device based on the control frame.

In another exemplary embodiment, may be implemented as a method. A method for assigning addresses to automation devices in a building automation system may comprise: connecting an automation device to a CAN automation network in the building automation system, broadcasting over the CAN automation network a unique identifier for the automation device, receiving the unique identifier at a control module for the building automation system, determining at the control module whether an address already exists for the automation device, reassigning an existing address for the automation device to the automation device if an address already exists, assigning a new address to the automation device if an address does not already exist, and issuing an ID response packet from the control module with the address for the automation device.

A method for updating program code for automation devices in a building automation system may comprise: broadcasting over a CAN automation network a download request identifying a current version of program code (e.g., firmware or scripts) at the automation device, receiving the download request at a control module, determining at the control module if a newer version of program code is available for the automation device, returning an end-of-file (EOF) packet to the automation device if a newer version of program code is not available for the automation device, and initiating a transfer session over the CAN automation network with the automation device if a newer version of program code is available for the automation device.

BRIEF DESCRIPTION OF THE DRAWINGS

FIG. 2 is an exemplary instruction table for use with in a building automation system.

DETAILED DESCRIPTION

Figure 1:
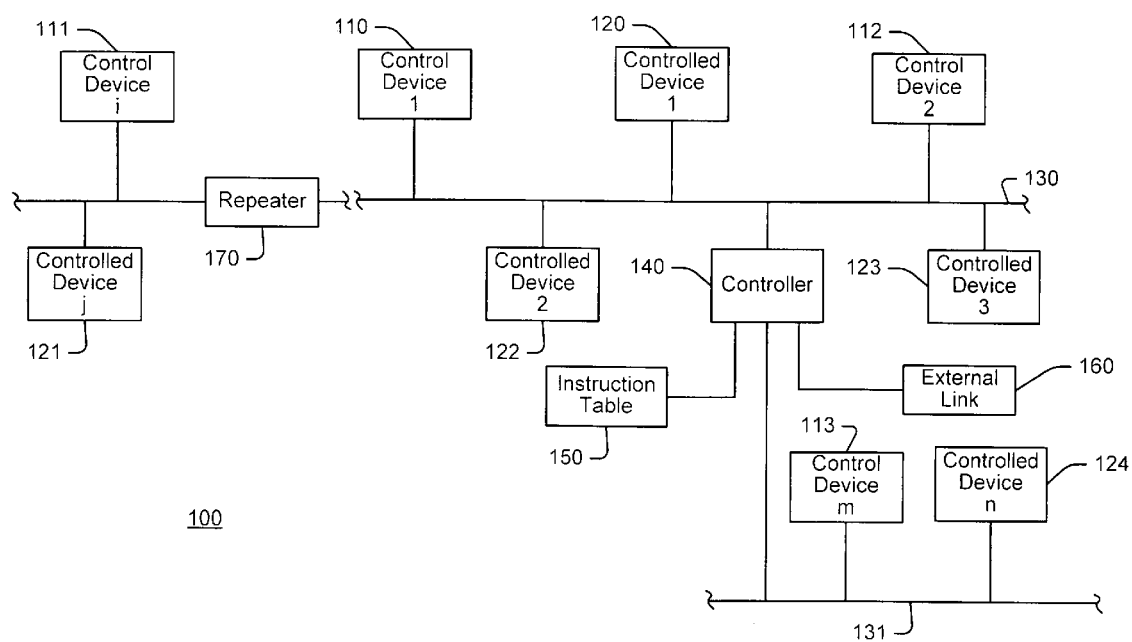
FIG. 1 is a high-level schematic diagram of an exemplary building automation system.

Briefly, building automation systems may be used to automate various functions in a home or other building (not shown). Exemplary functions may include lighting, heating, air conditioning, audio/visual output, operating window coverings to open/close, and security, to name only a few examples.

An exemplary building automation system 100 may include one or more automation devices, such as, control devices (e.g., a keypad) operatively associated with one or more controlled devices (e.g., a triac board). Control devices issue commands, which in turn instruct the controlled devices to perform a function. By way of example, when a homeowner (or more generally, a user) presses a key on the keypad, the central lighting in the room may illuminate to a predetermined intensity (e.g., 50%) and perimeter lighting in the room may be turned on (e.g., at 100% intensity) to illuminate artwork hanging on the walls.

It should be understood that the foregoing example is provided in order to better understand an exemplary environment in which building automation systems may be implemented. Of course building automation systems may also be implemented with any of a wide range of other types and configurations of automation devices, and for various functions beyond lighting a room, which are now known or that may be developed in the future. The particular types and configurations of automation devices may depend in part on design considerations, which can be readily defined and implemented by one having ordinary skill in the art after becoming familiar with the teachings herein.

In an exemplary embodiment, the automation devices are operatively associated with a control area network (CAN) bus. The CAN bus may comprise a two-wire differential serial data bus. The CAN bus is capable of high-speed data transmission (about 1 Megabits per second (Mbits/s)) over a distance of about 40 meters (m), and may be extended, e.g., to about 10,000 meters at transmission speeds of about 5 kilobits per second (kbits/s). It is also a robust bus and can be operated in noisy electrical environments while maintaining integrity of the data.

It is noted that the CAN bus implemented for building automation is not limited to any particular configuration or number of devices, and may comprise as many as 16,000 or more devices linked over extended runs throughout the building. The CAN bus may also include error handling and bus arbitration, enhancing performance of the building automation system. The speed with which a number of (i.e., one or more) devices may send and receive signals over a single CAN bus is particularly advantageous for building automation (e.g., lights can be turned on and off immediately without recognizable delay).

In addition, more than one CAN bus may be combined to extend the functionality of the building automation system. For example, a general purpose CAN bus may be provided for lighting and another CAN bus may be dedicated to the security system. The building automation system may also be modified for different devices and/or functions, even after the initial installation, allowing the building automation system to be tailored to the user's preferences.

Exemplary Building Automation Systems

FIG. 1 is a high-level schematic diagram of an exemplary building automation system 100. Exemplary building automation system 100 may comprise a CAN bus 130 for a number of automation devices. For example, one or more control devices 110-113 (also generally referred to herein as control device 110 or control devices 110) may be operatively associated with the CAN bus 130. In addition, one or more controlled devices 120-124 (also generally referred to herein as controlled device 120 or controlled devices 120) may be operatively associated with the CAN bus 130

It is noted that suitable interfaces (not shown) may be provided for coupling the control device 110 and controlled device 120 to the CAN bus 130 for issuing and receiving CAN signals over the CAN bus 130. Such interfaces are readily understood by those having ordinary skill in the art, and may be readily provided for use with the building automation systems described herein after having become familiar with the teachings herein.

An exemplary CAN bus 130 may be implemented as a two-wire differential serial data bus. The CAN specification is currently available as version 1.0 and 2.0 and is published by the International Standards Organization (ISO) as standards 11898 (high-speed) and 11519 (low-speed). The CAN specification defines communication services and protocols for the CAN bus, in particular, the physical layer and the data link layer for communication over the CAN bus. Bus arbitration and error management is also described. It is noted, however, that CAN bus 130 is not limited to any particular version. It is intended that other specifications for the CAN bus, now known or later developed, may also be implemented for the building automation systems described herein.

Before continuing, it is noted that the term "control device" as used herein is defined to include any suitable device (e.g., a keypad, sensor, etc.) which is generally configured to receive input and generate a signal based on the received input. By way of example, control device 110 may be a keypad or keyboard. When the user presses a key (or sequence of keys) on the keypad, one or more signals may be generated that are representative of the key(s) that were pressed. The signal(s), in turn, correspond to a predetermined function (e.g., dim central lighting to 50%, activate security system), as will be described in more detail below.

Control device 110 may be any suitable device and is not limited to a keypad or keyboard. Examples of other types of control devices include, but are not limited to, graphical user interfaces (GUI), personal computers (PC), remote control devices, security sensors, temperature sensors, light sensors, and timers.

It is also noted that the term "controlled device" as used herein is defined to include any suitable device which is generally configured to perform one or more functions in response to a signal issued by a control device. In an exemplary embodiment, the controlled device 120 receives the instruction over the CAN bus 130, as will be described in more detail below. In other embodiments, controlled device 120 may also receive input from sources other than the CAN bus 130.

By way of example, a controlled device may be implemented as a controllable alternating current (AC) switch and associated processing hardware and/or software, collectively referred to as a "triac board." When the triac board receives an instruction to dim the main lighting from a control device (e.g., a keypad), the triac board causes the main lighting to dim (e.g., to 50% intensity).

It is further noted that the terminology "control device" and "controlled device" is not limited to automation devices dedicated to "control" or "controlled" functionality, although such dedicated devices may also be implemented. In exemplary embodiments, automation devices may also be implemented as "multi-function" automation devices to perform the functions of both a control device and a controlled device. Although a multi-function automation device is not shown separately in FIG. 1, multi-function automation devices are represented in FIG. 1 as control device 110 and controlled device 120. That is, when the multi-function automation device performs the functions of a control device, it is represented in FIG. 1 as control device 110. When the multi-function automation device performs the functions of a controlled device, it is represented in FIG. 1 as controlled device 120.

Continuing now with the description of exemplary building automation system 100, control device 110 and controlled device 120 may be operatively associated with the CAN bus 130 in any suitable manner, including by permanent, removable, or remote (e.g., wireless) link. By way of example, control device 110 and/or controlled device 120 may be permanently linked to the CAN bus 130 by a hard-wire connection. Alternatively, control device 110 and/or controlled device 120 may be removably linked to the CAN bus 130 by a suitable "plug-type" connection (also referred to as a "bus tap"). Control device 110 and/or controlled device 120 may also be remotely (or wirelessly) linked to the CAN bus 130, for example via an RF link.

Building automation system 100 may also comprise an optional central controller 140 operatively associated with the CAN bus 130. Central controller 140 may be implemented, e.g., as a bridge. Central controller 140 may also be linked to the CAN bus 130 in any suitable manner, such as described above for control device 110 and controlled device 120.

Central controller 140 may be any suitable device generally configured to receive a signal from control device 110 over the CAN bus 130, and in turn, to issue a signal with a corresponding instruction over the CAN bus 130 for controlled device 120. In an exemplary embodiment, central controller 140 may be reprogrammable, i.e., capable of executing computer-readable program code (including but not limited to scripts), which can be changed to reprogram the central controller 140. By way of example, central controller 140 may comprise one or more personal computers or server computers, microprocessors, programmable logic devices (PLA) such as a field programmable gate array (FPGA) or application-specific integrated circuit (ASIC), to name only a few.

Before continuing, it should be noted that the term "central" in "central controller 140" is used to describe the interoperability with more than one of the control devices 110 and controlled devices 120. It is not intended to limit the physical location of the central controller with respect to the CAN bus 130 (or subnets 131) or the devices on the CAN bus 130.

It should also be noted that central controller 140 may be provided with various ancillary devices, for example, power supplies, electronic controls, input/output (I/O) devices, computer readable storage media, etc. Such ancillary devices are well-understood and therefore are not shown or described herein as further description is not needed for a full understanding of, or to practice the teachings herein.

In an exemplary embodiment, the central controller 140 also performs error checking and bus arbitration functions. Error checking and bus arbitration is defined by the CAN specification, currently in versions 1.0 and 2.0. These functions may be provided to enhance performance of the building automation system 100 by reducing the occurrence of corrupt or lost signals on the CAN bus 130.

As mentioned briefly above, central controller 140 is configured to receive signals over the CAN bus from control device 110, and issue signals with corresponding instructions over the CAN bus for controlled device 120. Central controller 140 may access the instruction from an instruction table 150, as described in more detail below with reference to FIG. 2.

Optionally, building automation system 100 may comprise one or more external link(s) 160. In an exemplary embodiment, external link 160 may comprise a link from central controller 140 to another network such as the Internet via an Internet service provider (ISP). In an exemplary embodiment, external link 160 may be used to import/export the instruction table 200 (e.g., at installation or for changes).

External link 160 may also be used to troubleshoot the building automation system 100. For example, when an error occurs on the CAN bus 130, the central controller 140 may generate an error message which may be transmitted to the building owner and/or a monitoring service (e.g., via email, pager alert, etc.).

Of course, it is understood that the external link 160 is not limited to an ISP link. In other embodiments, the external link 160 may be provided via a local area network (LAN), a wide area network (WAN), an Intranet, or a telephony link, to name only a few examples. In addition, external link 160 may connect to any suitable external device, such as to a laptop computer, personal digital assistant (PDA), pager, facsimile machine, or mobile phone, to name only a few. In addition, external link 160 may comprise a temporary connection for use by a service technician. For example, the external link 160 may comprise a link suitable for connecting a laptop computer to the building automation system 100.

Building automation system 100 may also comprise one or more optional repeaters(s) 170, e.g., provided in-line on the CAN bus 130. Repeater 170 may be used to extend the physical length of the CAN bus 130, and/or increase the number of devices that can be provided on the CAN bus 130. For example, repeater 170 may amplify signals and/or "clean" (e.g., improve the signal to noise ratio) the signals issued over CAN bus 130.

Building automation system 100 may also comprise one or more additional busses 131. In an exemplary embodiment, the optional bus 131 is also a CAN bus. In an exemplary embodiment, building automation system 100 may comprise dedicated busses 130, 131. Dedicated busses 130, 131 may be categorized by type of device, area of the building (e.g., first floor, bedrooms), or any other suitable category. For example, a dedicated CAN bus 130 may be provided for all of the lighting devices and another dedicated CAN bus 131 may be provided for all of the security devices. Accordingly, a failure in one CAN bus 130 does not affect operation of the other CAN bus 131.

FIG. 2 is an illustration of an exemplary instruction table 200 for use in a building automation system. Instruction table 200 may be defined based on various parameters, such as the needs and desires of the building occupant. The instruction table 200 may be operatively associated with a central controller for use with a building automation system (e.g., the central controller 140 and building automation system 100 in FIG. 1). For example, the instruction table 200 may be stored on suitable computer readable storage media accessible by the central controller.

Exemplary instruction table 200 may comprise signal data 205 and instructions 210. Signal data 205 corresponds to the input which may be received by a central controller (e.g., the central controller 140 in FIG. 1). In an exemplary embodiment, signal data 205 comprises the identity of the control device (Device ID) and the type of input received at the control device (Input ID). The instructions 210 identify functions that a controlled device (e.g., controlled device 120 in FIG. 1) may perform when the controlled device receives the corresponding signal data 205.

By way of example, signal data 205 may comprise Device ID=Device 1 and Input ID=Key 1. The instructions corresponding to this signal data 205 may be "Main Lighting 50%" and "Perimeter Lighting ON". In this example, if Device 1 issues a signal indicating that Key 1 is actuated, the central controller adjusts the "Main Lighting" to 50% intensity, and turns on the perimeter lighting by issuing instructions to the appropriate controlled device(s).

It is noted that the instruction table 200 may be defined in any suitable manner. For example, instruction table 200 may be defined as a code-driven table. However, instruction table 200 is not limited to any particular format and the embodiment shown in FIG. 2 is provided only for purposes of illustration.

In an exemplary embodiment, instruction table 200 may be generic (i.e., applicable to one or more predefined configurations of the building automation system 100). However, in another exemplary embodiment, the instruction table 200 may be custom or tailored to each building automation system 100. A custom instruction table may be defined after the configuration of a particular building automation system 100 is known.

According to either embodiment, instruction table 200 may be modified, reconfigured, or replaced, based at least in part on the changing needs and/or desires of the building occupants. For example, when the building changes occupancy, the instruction table 200 may be changed to reflect needs and/or desires of the new occupants. Modifying, reconfiguring, or replacing the instruction table 200 is particularly advantageous when one or more automation devices are added or removed from the building automation system. Modifying or replacing the instruction table 200 may also be used to change one or more parameters for the automation devices, such as, e.g., defining a new key on a keypad, changing the lighting intensity for a triac board, etc.

With reference now to FIGS. 1 and 2, exemplary building automation system 100 may be operated as follows. Control device 110 and/or controlled device 120 may be configured during manufacture, during installation, or when reconfiguring the building automation system 100. Instruction table 200 is provided for use by the controller 140. Instruction table 200 may also be defined for the building automation system 100.

After the building automation system 100 is configured and ready for use, control device 110 may be operated to receive input (e.g., from the user or other source), and generate signals based on the received input. By way of example, when the user enters input to control device 110 (e.g., by pressing one or more keys on a keypad), control device 110 may issue signal(s) that are representative of the input (e.g., the keys that were pressed). As an illustration, when the user presses the key labeled "Illuminate Artwork", control device 110 issues signal(s) corresponding to one or more functions to illuminate the artwork in the room. These signals are issued over the CAN bus 130 for one or more controlled devices 120.

In an exemplary embodiment, the signal(s) are broadcast by the control device 110 over the CAN bus 130. That is, signals are received by each of the devices (110, 120, 140) on the CAN bus 130. Each device (110, 120, 140) determines whether it should respond to the signal. It is noted that more than one device may respond to the signal. If the device determines that it should not respond, the device does nothing (i.e., the device "ignores" the signal).

Although addressing may be used, in other embodiments the device may respond even without an address if the signal identifies the device function(s). For example, a light controller may respond to a signal related to lighting and "ignore" signals related to environmental controls (e.g., heating/humidity/air conditioning).

In an exemplary embodiment, only the central controller 140 responds to signal(s) from control device 110. Although each of the devices on the CAN bus 130 receive the signal from control device 110, none of the other devices respond.

The central controller 140 receives the signal from control device 110. Central controller 140 responds by accessing the instruction table 200 and issuing an instruction based on the signal. For example, when the signal data includes Device ID of "Device 1" and Input ID of "Key 2", the corresponding instructions according to the instruction table 200 in FIG. 2 are "Main Lighting 50%" and "Perimeter Lighting ON". The central controller 140 issues these instructions over the CAN bus 130. The central controller 140 may also record activity on the CAN bus 130 during normal operation, and then use the recorded activity to issue instructions, e.g., when the building automation system is being operated in a vacation mode.

In an exemplary embodiment, the central controller 140 broadcasts a signal comprising the instructions over the CAN bus 130. The broadcast signal is received by each of the devices (110, 120, 140) on the CAN bus 130, and each device (110, 120, 140) determines whether it can respond to the instructions. If the device (110, 120, 140) determines that it cannot respond, it ignores the instructions.

In the above example, one of the devices (e.g., controlled device 122 in FIG. 1) may be a triac board for the main lighting circuit, and another of the automation devices (e.g., controlled device 123 in FIG. 1) may be a single-pull single-throw switching board (e.g., a switch with associated processing hardware and software) for the recessed perimeter lighting. Accordingly, controlled device 122 responds to the instruction "Main Lighting 50%" by dimming the main lighting circuit to 50%, and controlled device 123 responds to the instruction "Perimeter Lighting ON" by turning on the recessed perimeter lighting. The central lighting in the room dims and the recessed perimeter lighting turns on, illuminating artwork hanging on the walls in the room.

Of course it is understood that the above examples are merely illustrative of exemplary central control systems and methods, and is not intended to be limiting. Indeed, the building automation system 100 is also well-suited for performing more elaborate functions, now know or that may be later developed, as will be readily appreciated by one skilled in the art after having become familiar with the teachings herein.

Figure 3:
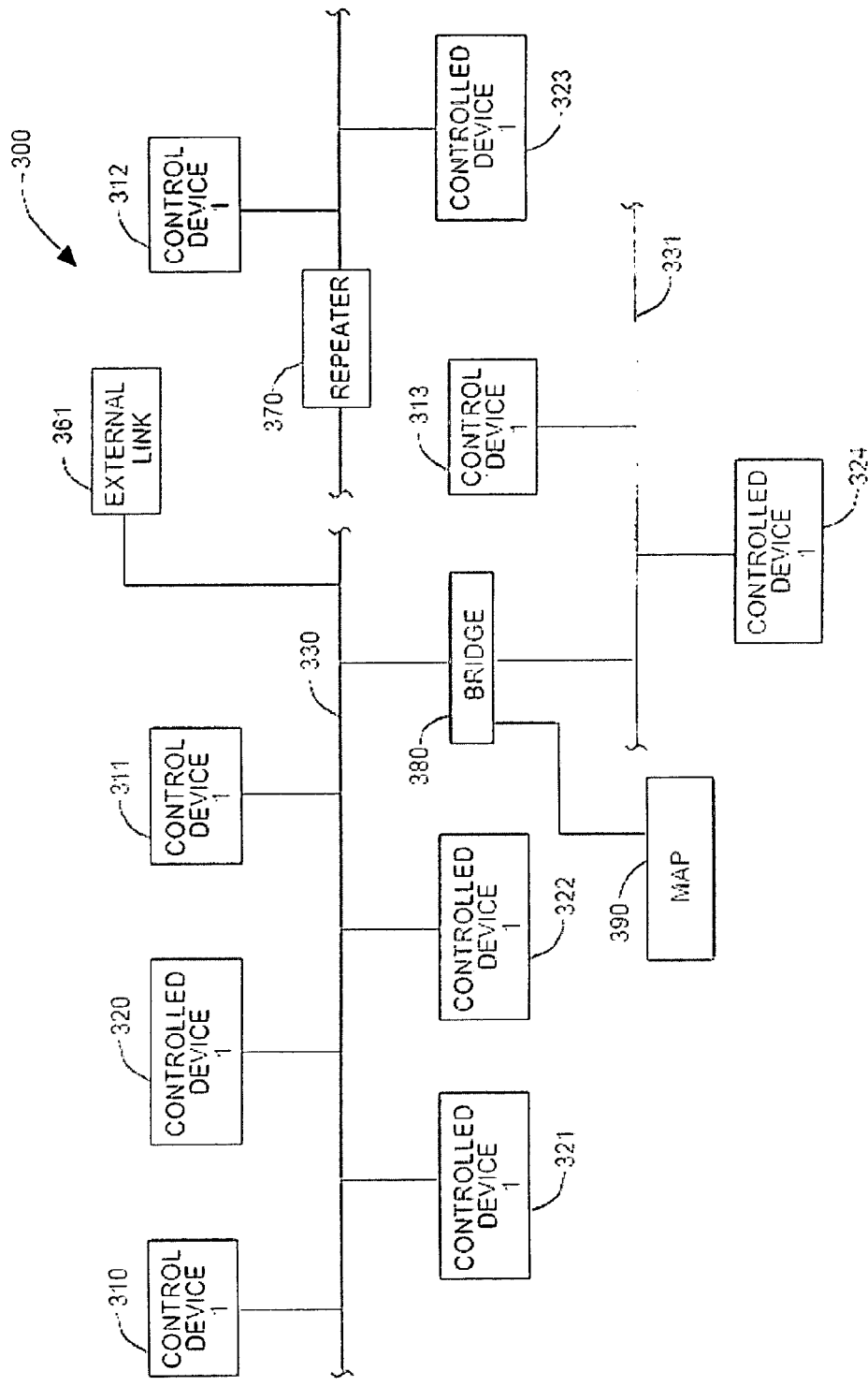
FIG. 3 is a high-level schematic diagram of another exemplary building automation system.

FIG. 3 is a high-level schematic diagram of another exemplary building automation system 300. Exemplary building automation system 300 may include at least one control device 310 and at least one controlled device 320 linked over CAN bus 330. It is noted that 300-series reference numbers are used to refer to the like elements shown in FIG. 1 and described above.

Exemplary building automation system 300 may comprise distributed controller(s) (such as distributed controller 400 shown in FIG. 4) operatively associated with one or more of the automation devices. For example, distributed controller (s) may be provided for each control device 310, for each controlled device 320, or for both control devices 310 and controlled devices 320.

Building automation system 300 may also comprise one or more maps 390 operatively associated with a bridge 380 (discussed in more detail below). In an exemplary embodiment, map 390 is stored in computer-readable storage accessible by the bridge 380. The map 390 may also be operatively associated with one or more of the distributed controllers.

Map 390 may be defined in any suitable manner. For example, map 390 may be defined as a text file using a word processor. Indeed, map 390 may be defined as part of an instruction table. It is understood, however, that map 390 is not limited to any particular format.

In an exemplary embodiment, map 390 comprises the identity of each device 310, 320 on the CAN bus 330. Of course, a truncated version of the map 390 may also be used and include only sonic of the devices. For example, the truncated version of map 390 stored at a controlled device 320 may only identify control devices 310 from which the controlled device 320 will receive signals. As another example, truncated versions of the map 390 may be provided at bridges 380 where the building automation system 300 has more than one bridge 380. Each bridge 380 is provided with a truncated map 390 identifying only devices on the CAN bus 330 that are linked to a particular bridge 380.

The map 390 may be updated manually (e.g., by exporting, modifying, and importing the map 390). Alternatively, map 390 may be updated by automatically detecting or determining which of the devices 310, 320 are on the CAN bus 330. When a device 310, 320 is added to or removed from the CAN bus 330, bridge 380 and/or distributed controllers 400 automatically determine the status of the devices 310, 320 on the CAN bus (i.e., whether a device has been added or removed). Bridge 380 and/or distributed controllers 400 may update the maps 390 to reflect any changes.

By way of example, when a device 310, 320 is added to the CAN bus 330, a distributed controller operatively associated with the added device may issue a signal with its device address. When the bridge 380 and/or others of the distributed controllers receive the signal and do not recognize the device address (e.g., it is not listed in map 390), map 390 may be updated with the identity of the added device. Similarly, when a device 310, 320 does not respond, map 390 may be updated to indicate that the non-responsive device has been removed from the CAN bus 330, or is otherwise offline.

If dynamic addressing is used, as discussed above, the bridge and/or distributed controllers may also be used to assign a dynamic address to an added device. For example, bridge 380 and/or distributed controller may assign a dynamic address that is not already being used, and update the map 390 accordingly. The bridge 380 may also issue a signal comprising the dynamic address to the distributed controller of the added device (e.g., as a dynamic address). Similarly, the dynamic address may be removed from map 390 when a device is removed from the CAN bus 330.

Building automation system 300 may also optionally comprise an external link 360. External link 360 may interface with the CAN bus 330 through one or more of the control devices 310, controlled devices 320, and/or bridge 380. Alternatively, external link 360 may interface via a port provided on the CAN bus 330. As discussed above with reference to FIG. 1, external link 360 may be used to import/export instruction table(s), maps 390, etc. External link 360 may also be used to troubleshoot the building automation system 300.

Building automation system 300 may also comprise an optional repeater 370. Repeater 370 may be provided on the CAN bus 330 to extend the physical length of the CAN bus 330. As discussed above with reference to FIG. 1, repeater 370 may be used to extend the physical length of the CAN bus, and/or increase the number of devices that can be provided on the CAN bus. For example, the repeater may amplify and/or clean signals (i.e., by improving the signal to noise ratio) issued over the CAN bus.

Building automation system 300 may also comprise one or more additional busses 331, which may be linked to one another via bridge 380 as shown in FIG. 3. Although not required, the optional bus 331 may also be a CAN bus. As discussed above, building automation system 300 may comprise separate and/or dedicated busses 330, 331 for different areas of the building and/or for different functions.

Figure 4:
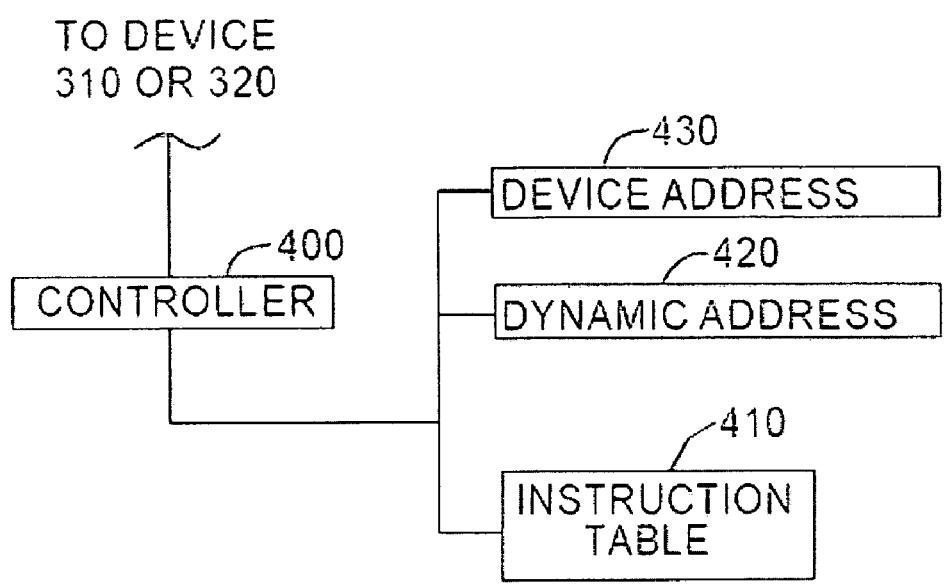
FIG. 4 is a high-level schematic diagram of exemplary distributed controllers for a building automation system.

FIG. 4 is a high-level schematic diagram of exemplary distributed controllers for a building automation system. Distributed controller 400 may be any suitable device configured to process signals (such as the signals discussed in more detail below). In an exemplary embodiment, distributed controller 400 may be reprogrammable, i.e., capable of executing computer-readable program code (including but not limited to scripts), which can be changed to reprogram the distributed controller 400. One or more of the distributed controllers 400 may also perform error checking and bus arbitration functions for the CAN bus.

Exemplary distributed controllers 400 may comprise one or more microprocessors, PLAs (e.g., FPGA, ASIC), etc. It is noted that distributed controllers 400 may be operatively associated with automation devices, such as, control device 310 and/or controlled device 320, in any suitable manner. In an exemplary embodiment, distributed controllers 400 are provided at, and are directly linked to the automation device (e.g., as part of the same computer board).

In an exemplary embodiment, only the device operatively associated with a failed or otherwise offline distributed controller 400 is affected by such failure (or by being offline). Other automation devices of the building automation system 300 may continue in operation even though one or more of the distributed controllers 400 is no longer operational.

Exemplary Device Addresses

In an exemplary embodiment, the automation devices may each comprise a device address. Each device address may be unique to the device, referred to herein as a Globally Unique ID (or GUID). For example, a GUID may be assigned to the automation devices as unique part numbers, although it is noted that the part number need not be numerical. The GUID may be provided with each automation device in a suitable memory, although other embodiments are also contemplated as being within the scope of the teachings herein. In any event, no other automation device has the same device address, thereby reducing the likelihood that the automation device is misidentified. For example, a triac board is not misidentified on the CAN bus as a security board (e.g., activating an alarm when the user intends to turn on the lights).

It is understood that other embodiments are also contemplated. In another exemplary embodiment, the GUID may be unique to a category of devices. For example, each triac board may have the same GUID, which is different from the GUID used to identify electric motor controls. Yet other embodiments are also contemplated and will become apparent to those skilled in the art after having become familiar with the teachings herein.

Although the GUID itself may be provided in the address field of the signal to identify automation devices, the GUID may be too long to effectively implement, e.g., including ten, twenty, or even more digits. That is, a large address field may reduce the size that can be allotted to other fields (e.g., to instruction field). In addition, a signal having a large address field may require significant bandwidth for transmission over the CAN bus. High bandwidth signals slow transmission speeds, and may need to be transmitted as multiple packets, increasing congestion on the CAN bus.

In an exemplary embodiment, dynamic addressing may be implemented for each automation device or category of devices. That is, each automation (or category of devices) may be assigned a dynamic address that is unique to a particular building automation system. The dynamic address may be shorter than the GUID and still uniquely identifies the automation device (or category of devices) in a particular building automation system (or on a particular "leg" of the building automation system).

By way of example, consider three keypads Keypad A, Keypad B, and Keypad C. Keypad A and Keypad B are used in one building automation system (System A), and Keypad C is used in a separate building automation system (System B). Each keypad has a GUID that is different than any other device. For example, Keypad A may have GUID "123ABC," Keypad B may have GUID "123XYZ," and Keypad C may have GUID "456ABC". According to this embodiment, each keypad is assigned a dynamic address when it is provided in the building automation system. For example, Keypad A is assigned dynamic address "10," Keypad B is assigned dynamic address "20," and Keypad C is assigned dynamic address "10." Although Keypad A and Keypad C both have the same dynamic address (i.e., "10), these keypads are used in different building automation systems (System A and System B), or in different subnets, and therefore are still uniquely identified in their respective systems (or subnets). However, Keypad A and Keypad B are both used in System A, and therefore are assigned dynamic addresses that are unique to System A to avoid being misidentified.

Figure 5:
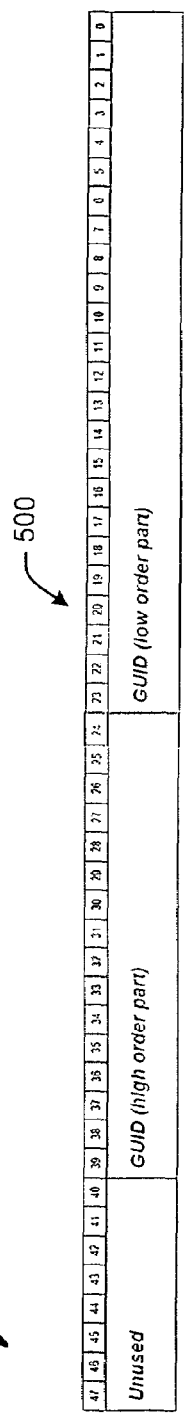
FIG. 5 illustrates an exemplary a Globally Unique ID (GUID).

FIG. 5 illustrates an exemplary a Globally Unique ID (or GUID) 500. Exemplary GUID 500 is a factory assigned serial number (e.g., 40 bits in length plus a part number), which identifies an automation device uniquely among all automation devices available for the building automation system. The GUID 500 may be issued to a control device (e.g., bridge) in the building automation network, which uses the GUID 500 to assign a dynamic address to uniquely identify the automation device (or category of automation devices) in the building automation system. After assigning the dynamic address, the bridge may issue a signal to the device with the dynamic address.

The control protocol may include an address assignment protocol to assign unique device ID's to devices when the devices are first connected to the CAN bus. In an exemplary embodiment, the address assignment protocol is implemented by a primary bridge module (on each subnet), although it may be implemented by another bridge or control module.

Figure 5A:
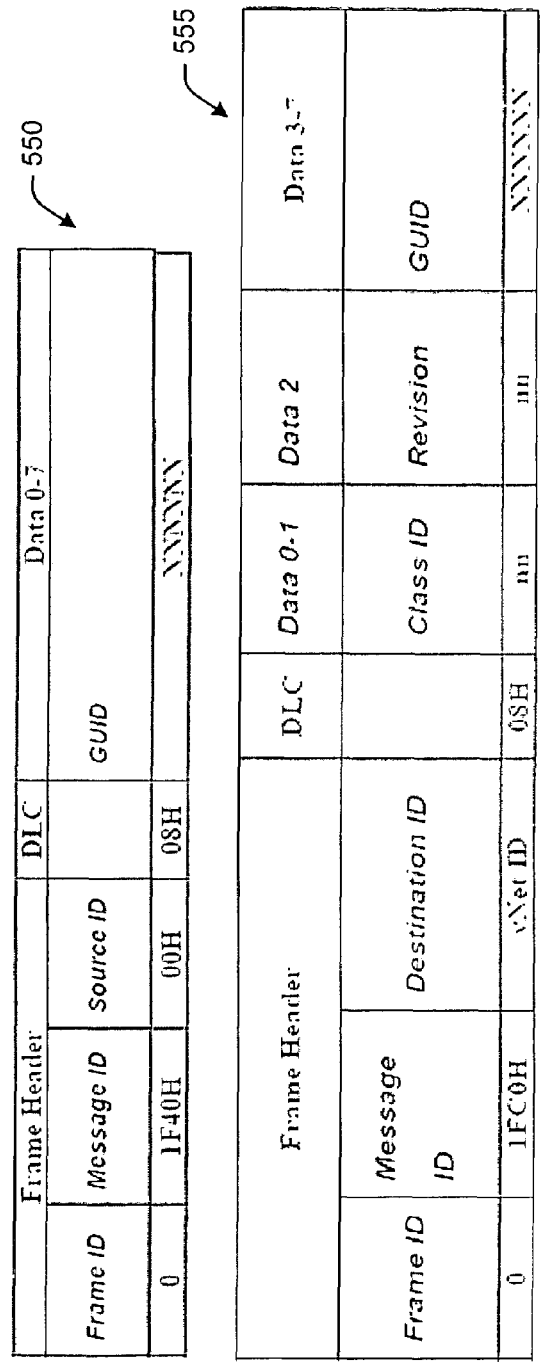
FIG. 5a illustrates an exemplary ID request packet and exemplary ID response packet.

FIG. 5a illustrates an exemplary ID request packet 550 and exemplary ID response packet 555. After a device is installed (or replaced, reset, etc.), the device sends an ID Request Packet 550 including its GUID to the bridge (or broadcasts the ID in the building automation system and is received by the bridge). The bridge looks up the GUID in its address table, and if not already present, determines a new dynamic address for the module. If the GUID is already present (e.g., when the device was taken offline for repair, reset, or replacement), it re-assigns the previously assigned dynamic address to the device.

It is noted that a "self-healing" procedure may also be implemented. In an exemplary embodiment, a replacement device (e.g., a new keypad replacing an existing keypad in the building automation system) may be assigned the same dynamic address even if the replacement device has a different GUID than the original device. For example, the bridge may recognize that an original device was taken offline (stopped functioning or otherwise disabled), and that a replacement device of the same type (e.g., another keypad) is being installed on the building automation system (e.g., in the same subnet). Accordingly, the bridge may assign the same dynamic address of the original device to the replacement device.

After determining a dynamic address for the device, the bridge may respond by issuing an ID response packet to the device (or broadcasting it so that it is received by the device). If the ID response packet is broadcast, it is the responsibility of the receiving devices in the building automation network to determine if the ID response packet is intended for the device. For example, the data portion of the ID response packet may remain unchanged, e.g., it is a duplicate of the ID request packet that the device sent to the bridge. Accordingly, the devices may check that the GUID in the ID response packet is a match to its own internal GUID.

The device saves the dynamic address, e.g., permanently or semi-permanently in flash memory. As noted above, the dynamic address may also include the subnet information for the CAN bus that the device is connected to. The dynamic address may then be used for all communications to and from the device. In addition, the dynamic address may be also be used to program the acceptance filter for the device.

Acceptance filters may be implemented at the devices for filtering broadcast signals. In an exemplary embodiment, distributed controllers may read the address in the address field and determine whether it corresponds to the address of the particular device. If the address does not correspond to the device address, the device does not respond. In an exemplary embodiment, the device stops processing the signal, thereby conserving processing power and increasing the efficiency of the building automation system. On the other hand, if the address in the address field corresponds to the address of the device, the device continues processing the signal. Again, it is noted that more than one device may respond to a signal.

It is noted that signals may also be addressed to all (or a group) of the devices (e.g., by setting the address field to null). For example, a signal may be addressed to all of the devices so that the user can readily reset all of the devices on the CAN bus after a power outage. Likewise, a signal may be addressed to groups of devices by including a group identification in the address field or another field. For example, a signal may be addressed to all of the devices, or particular types of devices (e.g., the lights) or categories of devices (e.g., outdoor lights) so that the user can readily shut all of those devices (e.g., by pressing a single key).

Figure 6:
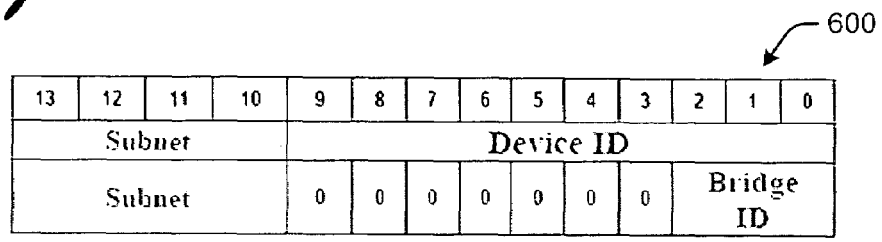
FIG. 6 is an exemplary signal including a dynamic address for a device in the building automation system.

FIG. 6 is an exemplary signal 600 including a dynamic address for a device in the building automation system. The dynamic address may include a 14-bit ID field. The high order 4 bits (bits 10-13) may provide subnet information. When the dynamic addresses are assigned, grouping of device addresses on a local physical network may be used to configure subnets. A subnet mask may then be applied to enable the routing of packets across the building automation system. In an exemplary embodiment, a maximum of 16 subnets may be defined. It is noted, however, that any number of subnets may be implemented. Indeed, even the use of subnets is optional.

In an exemplary embodiment, 16,384 unique dynamic addresses are available for a particular building automation system. In this example, a maximum number of addresses available on a single subnet is 1024 (if using 4 bits to define the subnet.) However, multiple systems may be bridged to provide additional capacity.

Addresses 0 through 7 may be used exclusively for bridges. In this example, there is a maximum of eight bridges per subnet. The following identifiers may be reserved as shown in Table 1.

TABLE 1

Reserved Identifiers

| Identifier | Description |
|---|---|
| 0000H | Primary bridge module |
| 0001H | Backup bridge module |
| 0002H–0007H | Reserved for future bridge modules |
| 3FFFH | All modules. |

Exemplary Signals

Figure 7:
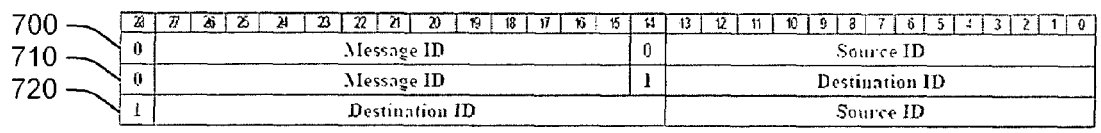
FIG. 7 is a more detailed illustration of exemplary signals for device communication in a building automation system.

FIG. 7 is a more detailed illustration of exemplary signals for device communication in a building automation system. Exemplary signals 700, 710, and 730 may be implemented as 29-bit extended identifiers (e.g., bits 0-28 in FIG. 7), including, e.g., a Destination ID, Source ID and/or Message ID. The field definitions ignore various bit fields provided in the CAN protocol specification. Instead these definitions include only the extended ID and the data bytes available to the device application and may be encapsulated into CAN extended frames.

In an exemplary embodiment, two types of frames may be implemented. The frame type may be defined in bit 28, where for example, a "zero" in bit 28 defines the signal or packet as a Control frame (or Type 1 packet) and a "one" in bit 28 defines the signal as a Data frame (or Type 2 packet).

Control frames (or Type 1 packets) are used to send control information across the network. Control frames may be different types, e.g., depending on the Message ID field. For example, these may be divided into two groups: Command Packets and Event Packets. Command packets are used to send information requesting that a device perform some action or respond with status information. Event packets are used to indicate that some action has occurred at a device (or module operatively associated with the device, e.g., a temperature sensor). The Message ID field includes a message code that defines an event or action. The Device ID of the sender or receiver may be designated, e.g., by bit 14. For purposes of illustration, a "zero" in bit position 14 identifies the Device ID as the Source Device, and a "one" in bit position 14 identifies the Device ID as the Destination Device. A typical Control packet may include a Message ID (e.g. Key Pressed) and a Source ID (e.g. Keypad 1). The two values are combined by the receiving device to identify a unique (system wide) value that is used to trigger some action in the building automation system (e.g., execute a device application).

Data frames (or Type 2 packets) are used to send data between devices. The Destination Field ID is the address of the target device. All devices decode this field to determine whether the message is intended for them, e.g., using acceptance filters in the CAN protocol.

Specific device(s) may be addressed in the automation system to process signals, or the signals may be broadcast to a plurality of the devices (e.g., all of the devices in the system, or all of the devices on a CAN bus network or subnet). Signals having Destination ID's may be filtered or routed, e.g., by a bridge controlling the subnet where the packet originated. Such an embodiment limits CAN traffic on other subnets to only packets that may be of use to devices on a particular subnet. The Message ID field values are assigned to reflect message priority information.

The Source ID is address of the sending module (e.g., the dynamic address). It may be used by the destination device to return data or an acknowledgement to the sending device. This use is independent of REMOTE FRAME messages defined in the CAN specification.

In an exemplary embodiment, the signals may include a CAN identifier, followed by up to 8 data bytes of information. The definition of the data portion of a packet depends on the frame type being used, as discussed above.

All values consisting of more than one byte are big-endian, i.e., MSB is transmitted first. Control frames are used to send messages to multiple nodes on the network. In an exemplary embodiment, a CAN acceptance filter for each module may be set to accept messages that are of interest to the module, ignoring all others and resulting in less overhead for the device. Since multiple modules may handle the same message, there is no acknowledgement of the message back to the sender (other than the link level CAN acknowledgement).

Figure 8:
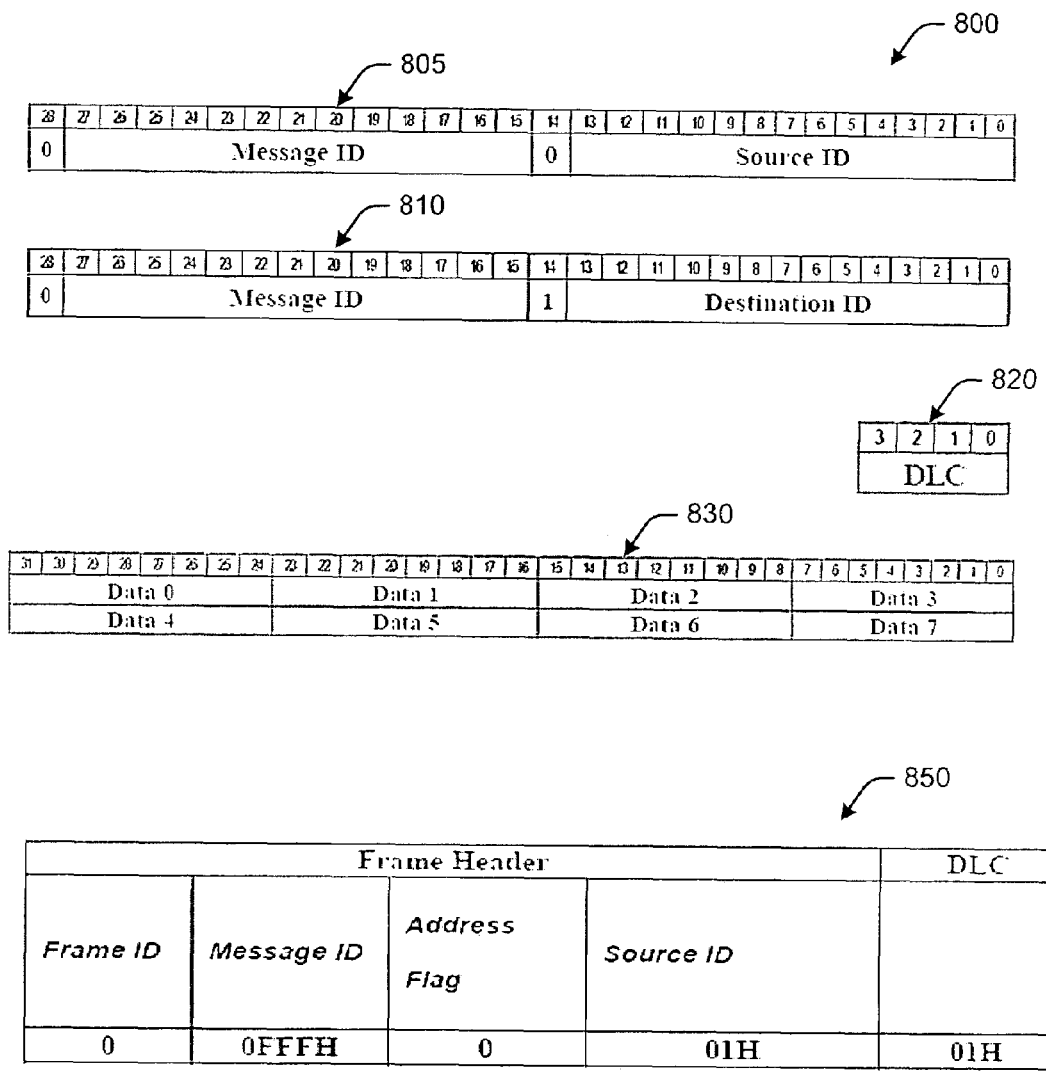
FIG. 8 illustrates exemplary control frames which may be used for device communication in a building automation system.

FIG. 8 illustrates exemplary control frames 800 which may be used for device communication in a building automation system. It is noted that device communication described herein may be implemented in any CAN automation network, such as the CAN bus shown in FIG. 1, the CAN hub-and-spoke system described in co-owned U.S. patent application Ser. No. 11/216,685 for "CAN BUS ROUTER FOR BUILDING AUTOMATION SYSTEMS" of Hesse, et al., and/or a hybrid network (e.g., CAN and Ethernet network). Device communication may also be implemented in a central and/or distributed control system, and is not limited to implementation with a bridge.

There are two types of headers 805, 810 for control frames. The first type of frame header 805 specifies the Device ID as the sender's ID and may be used to broadcast a message to all devices (or group of devices) in the building automation system. The second type of frame header 810 is used to send a message to a specific destination device.

Messages identify an event that has taken place at a device (e.g., a key press on a keypad) or an action to be performed by another device (e.g., activating lights). It is noted that a single message may identify an event that one or more devices respond to. For example, a single key press event at a keypad may turn on the audio system and dim the lights. A global list of message codes is defined as part of the building automation system. Each Message ID is 13 bits in length, resulting in a total of 8192 unique message IDs.

In an exemplary embodiment, two ranges of messages may be implemented. For example, messages with the high order bit (e.g., bit 14 in FIG. 8) set to "0" are considered priority messages and take precedence on the CAN bus over all other messages (e.g., messages with the high order bit set to "1").

Control frames may also include a Data Length Code (DLC) 820. DLC 820 is part of the CAN protocol and used to specify the number of data bytes to be included in the packet. This value depends on the type of message being transmitted. Most packets include at least one data byte. The message-related data portion of the packet 830 (e.g., Data 0 to Data 7) follows the DLC and may vary depending on the type of message being sent.

For purposes of illustration, an exemplary control packet 850 is illustrated in FIG. 8. Exemplary control packet 850 is broadcast to all devices in the building automation system and includes instructions to reset all devices on the network.

Figure 9:
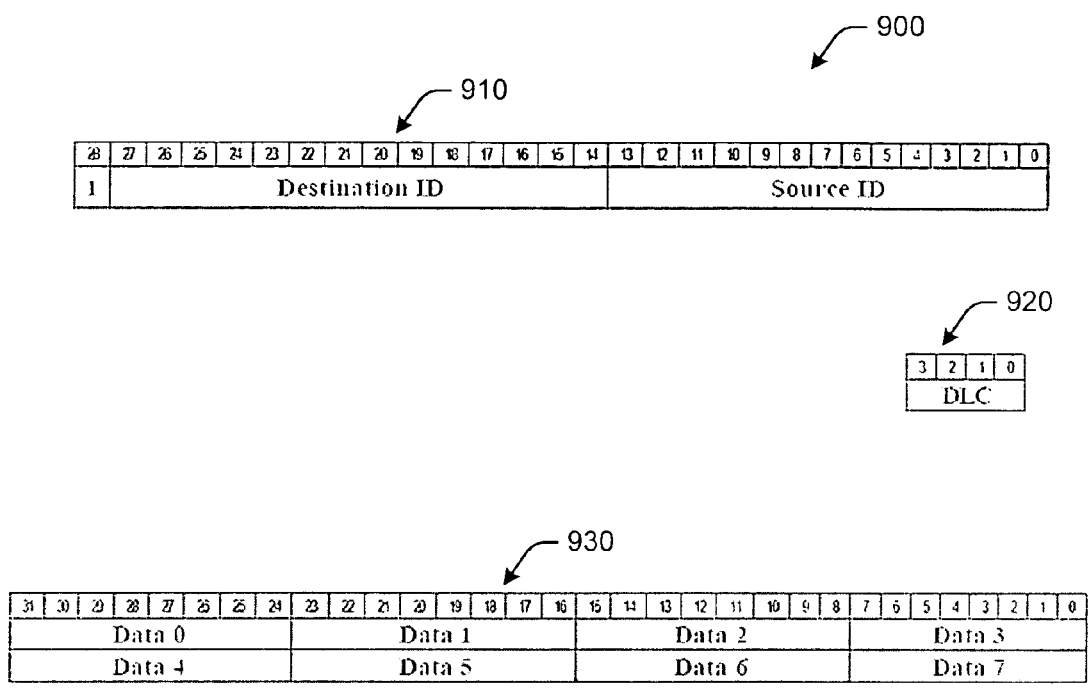
FIG. 9 illustrates exemplary data frames which may be used for device communication in a building automation system.

FIG. 9 illustrates exemplary data frames 900 which may be used for device communication in a building automation system. Data frames 900 may be implemented to send information to other devices on the network. The data frame 900 may include a frame header 910 with Destination ID. The Destination ID is the address of the destination module and the Source ID is the address of the sending module (e.g., dynamic addresses of the devices). The Data Length Code (DLC) 920 is part of the CAN protocol and may specify the type of data packet being sent.

In an exemplary embodiment, a DLC value (e.g., value of "7") may be reserved for control packet encapsulation. This is a special mode that enables control packets to be sent with both a source and destination address. In this mode the control packet (destination type) is sent as a data packet. The first byte of the data portion contains the low 8 bits of the Message ID, and the next six bytes of the control packet are placed into bytes 1 through 6. Data 0 to Data 7 is the message related data portion 930 of the packet, and may vary depending on the type of message being sent.

In an exemplary embodiment, data packet exchanges may include a packet that is sent to a receiving device, and may be followed by an ACK frame sent by the receiving device back to the sender. It is up to the sender to determine whether to resend packets, e.g., when an ACK/NAK indicator has not been received for some predetermined period of time.

Exemplary Messaging

Exemplary protocols may be implemented to transfer messages within the building automation system. It is noted that transfer may include device-to-device transfers and transfers from one network (e.g., the CAN bus) to another network (e.g., the Ethernet). For example, a control protocol may be implemented to send packets to perform a function or request/report status for devices in the building automation network. Or for example, a control protocol may be implemented to update program code (e.g., firmware) at a device.

Figure 10:
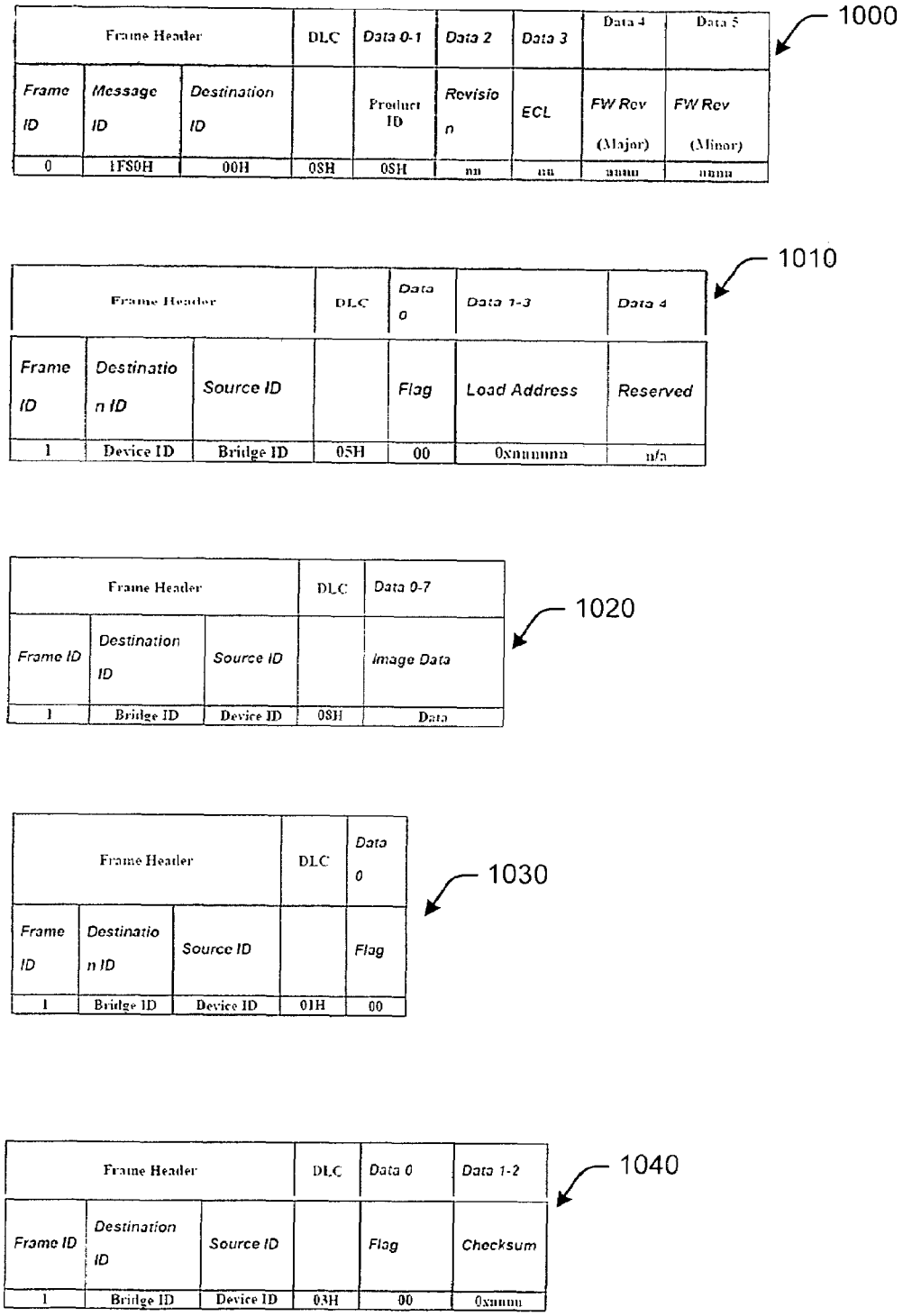
FIG. 10 illustrates exemplary file transfer packets.

FIG. 10 illustrates exemplary file transfer packets. A device may request new firmware from the bridge (or other source), e.g., when it is first installed or at other times. The device sends a firmware download request packet 1000 to the bridge (e.g., by broadcasting). Data bytes 4 and 5 may include the revision information for the firmware currently loaded on the device.

The bridge receives the firmware download request packet 1000 and compares information in the packet to the available firmware revisions for the device. If the bridge determines that no firmware needs to be downloaded, it can send an end-of-file (EOF) packet to restart the device. If a newer revision is available, it initiates a transfer session with the device.

The transfer session may implement a file transfer header packet 1010, followed by file transfer data packets 1020, and an EOF packet 1040. In this example, the DLC field identifies the packet types, e.g., as "Firmware Download". When the device receives the file transfer header packet 1010, it initiates a file transfer session. The device accepts data packets (DLC=8) from the source address that initiated the transfer (e.g., a bridge), until an EOF packet 1040 is received or a timeout occurs. Data is written to successive addresses from the initial load addresses.

After all of the data is sent to the device, the host may issue an EOF packet 1040 to finalize the transfer and enable the device to verify the data. All packets with DLC values other than previously defined are responded to with a NAK packet. The defined value for the DLC is 3. The receiving device may then implement the checksum in the EOF packet to determine if the data was received correctly. If so, it will respond with an ACK, if not, a NAK is sent. After the EOF packet 1040 is processed by the device, it determines whether to restart or initiate a new download request.

In exemplary embodiments, each packet received by the device may be acknowledged with an ACK packet. The ACK Flag byte may be defined as "zero" for an ACK and "non-zero" or "one" for a NAK. Future versions may use the flag byte to indicate the type and severity of a transfer error. The ACK sequence allows the device to commit the data to memory (completing any erase/write operations) before allowing the host to send a new data packet.

Exemplary Intra-Network Communications

As noted above, devices may also communicate with one another across different types of networks (e.g., the CAN bus and an Ethernet). In an exemplary embodiment, CAN messages may be sent over the Ethernet using the UDP protocol. The UDP data consists of the extended CAN ID plus the DLC and the 8-byte message as shown in Table 2.

TABLE 2

UDP Data Format

| Size (bytes) | Description |
| --- | --- |
| 4 | Extended CAN ID, 29 bits. |
| 1 | DLC |
| 8 | CAN Message |

The CAN messages may be broadcast to a dedicated port (e.g., port 7777 or other assigned port number) on the bridge, and the Ethernet device(s) determines whether the message is intended for the Ethernet device(s).

It is noted that other embodiments are also contemplated as being within the scope of the invention. For example, communications may be encrypted, or a "Key Exchange" may be implemented for secure communications.

In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A building automation system comprising:
   at least one sending device linked to a plurality of receiving devices over a CAN automation network;
   a control frame broadcast over the CAN automation network by the at least one sending device, the control frame encapsulated into a CAN extended data frame, wherein the control frame includes one or more of a command packet for requesting the target device to execute an automation function, a command packet for requesting status information from the target device, and an event packet indicating only that an action occurred at the sending device; and
   an acceptance filter at each of the plurality of receiving devices, each of the plurality of receiving devices reading the control frame from the CAN extended data frame and determining if the receiving device is a target device based on the control frame.

2. The building automation system of claim 1 wherein a single event identified in the event packet triggers action at a plurality of automation devices.

3. The building automation system of claim 1 wherein a single event identified in the event packet triggers action at a single automation device.

4. The building automation system of claim 1 further comprising a data frame broadcast over the CAN automation network by the at least one sending device, the data frame encapsulated into a CAN extended data frame for sending data between devices on the CAN automation network.

5. The building automation system of claim 4 wherein the control frame and data frame each include a destination field ID identifying an address of the target device.

6. The building automation system of claim 5 wherein the acceptance filter decodes the destination field ID to determine if the receiving device is the target device.

7. The building automation system of claim 4 wherein the control frame and data frame each include a source ID identifying an address of the sending device.

8. The building automation system of claim 7 wherein the target device returns data to the sending device using the source ID.

9. The building automation system of claim 7 wherein the target device returns either an ACK or NAK to the sending device using the source ID.

10. The building automation system of claim 1 wherein the control frame is issued as a priority message.

* * * * *